US007046899B2

(12) United States Patent
Colombo et al.

(10) Patent No.: US 7,046,899 B2
(45) Date of Patent: May 16, 2006

(54) UNIVERSAL APPARATUS FOR INCORPORATING INTELLIGENCE INTO AN OPTICAL FIBER DISTRIBUTION FRAME

(75) Inventors: Bruce A. Colombo, Pompton Plains, NJ (US); Clay A. Feustel, Lawrenceville, GA (US); Mark R. Jennings, Andover, NJ (US); Alex Richard, Dover, NJ (US); Peng Wang, Alpharetta, GA (US)

(73) Assignee: Furukawa Electric North America, Inc., Norcross, CA (US)

( * ) Notice: Subject to any disclaimer, the term of this patent is extended or adjusted under 35 U.S.C. 154(b) by 0 days.

(21) Appl. No.: 10/791,115

(22) Filed: Mar. 2, 2004

(65) Prior Publication Data

US 2005/0196120 A1    Sep. 8, 2005

(51) Int. Cl.
*G02B 6/00*    (2006.01)

(52) U.S. Cl. ..................................................... 385/135

(58) Field of Classification Search ........ 385/134–135, 385/147

See application file for complete search history.

(56) References Cited

U.S. PATENT DOCUMENTS

| 5,448,675 | A | | 9/1995 | Leone et al. | |
|---|---|---|---|---|---|
| 5,461,693 | A | | 10/1995 | Pimpinella | |
| 5,694,511 | A | * | 12/1997 | Pimpinella et al. | ......... 385/134 |
| 5,960,130 | A | * | 9/1999 | Pimpinella | ................... 385/15 |
| 6,400,883 | B1 | | 6/2002 | Jennings et al. | |
| 6,437,894 | B1 | | 8/2002 | Gilbert et al. | |
| 6,493,498 | B1 | | 12/2002 | Colombo et al. | |
| 6,501,897 | B1 | | 12/2002 | German et al. | |

* cited by examiner

*Primary Examiner*—Javaid H. Nasri

(57) ABSTRACT

Embodiments of the invention include a universal apparatus for incorporating intelligence into the distribution frame of an optical communication system. The communication system includes a distribution frame with one or more distribution shelves having one or more interconnection panels, and a universal operations, administration and maintenance (OA&M) apparatus attached to the distribution frame. The OA&M apparatus, which is operably connected to the interconnection panels and the distribution frame's system controller through an interface, monitors current interconnection panel connections including cross-connections and can indicate future possible cross-connections between interconnection panels. The OA&M apparatus also is useful for jumper routing, circuit administration, and other features associated with the distribution frame and its fiber connections.

17 Claims, 4 Drawing Sheets

UNIVERSAL APPARATUS FOR INCORPORATING INTELLIGENCE INTO AN OPTICAL FIBER DISTRIBUTION FRAME

BACKGROUND OF THE INVENTION

1. Field of Invention

The invention relates to optical fiber distribution frames. More particularly, the invention relates to incorporating intelligence into optical fiber distribution frames.

2. Description of Related Art

Within optical fiber communication systems, fiber distribution frames (FDFs) or lightguide cross-connect (LGX) frames are used to optically couple various optical fiber networks. For example, a fiber distribution frame is used to cross-connect optical fibers from an outside environment entering a customer's premises to internal optical fibers for equipment on the customer's premises. The fiber distribution frame incorporates an administration system that makes use of electrical, optical and software-based intelligence to operate, organize and monitor the optical cross-connections.

A fiber distribution frame typically includes one or more bays, with each bay including a plurality of fiber distribution shelves. The distribution frame includes one or more covers for protecting the fiber distribution shelves. Each fiber distribution shelf typically includes a plurality of optical coupling or interconnection modules or panels that serve as termination points for individual optical fibers. Optical cross-connect jumper cables (i.e., jumpers) optically cross-connect incoming optical fibers to desired outgoing optical fibers between various panel locations.

Each shelf includes a shelf controller that has the necessary software incorporated therein for tracking and monitoring the activity of the interconnection panels on the respective shelf. The shelf controller typically is located on the side of the shelf or directly behind the shelf on the distribution frame, but can be located anywhere on the distribution frame. The shelf controllers are operably connected to a system controller, which tracks and monitors the interconnection activity of the interconnection panels between the various shelves. The system controller typically is located on the top of the distribution frame or on the back of the distribution frame behind the shelves.

In a conventional arrangement, the distribution frame also includes individual overlays or faceplates for each interconnection panel. The overlay includes a signal button and an indicator for identifying the connection status of the panel's termination points. The overlays are located directly on the face of the panel, either on top of or immediately adjacent to the panel termination points. Each overlay typically is individually connected to the shelf controller.

In conventional arrangements, installing or otherwise attaching overlays typically requires the partial removal of individual panels from their respective shelf position. Moreover, operating the various signal buttons on the overlays requires direct access to the interconnection panels, which often requires removal of the distribution frame protective cover(s). However, removing individual panels and/or the protective cover(s) can cause unnecessary shifting of fiber terminations to the point of disconnecting fiber connections. Also, removing individual panels and/or the protective cover(s) is cumbersome and inefficient. Moreover, because there exists many different shelf manufacturers, not all shelf features and arrangements are the same. However, it is not economical to produce universal overlays for all types of panels. Thus, overlays must be installed or otherwise attached to panels in different ways for different shelf layouts.

Accordingly, it would be desirable to have available a universal apparatus for incorporating the panel overlay intelligence and other operation and maintenance functionality into the fiber distribution frame.

SUMMARY OF THE INVENTION

The invention is embodied in a universal apparatus for incorporating intelligence into the distribution frame of an optical communication system. The communication system includes a distribution frame with one or more distribution shelves having one or more interconnection panels, and a universal operation, administration and maintenance (OA&M) apparatus attached to the distribution frame. The OA&M apparatus, which is operably connected to the interconnection panels and the distribution frame's system controller through an interface, monitors current interconnection panel connections including cross-connections and can indicate future possible cross-connections between interconnection panels. The OA&M apparatus also is useful for jumper routing, circuit administration, and other features associated with the distribution frame and its fiber connections.

DETAILED DESCRIPTION OF EXEMPLARY EMBODIMENTS

Figure 1:
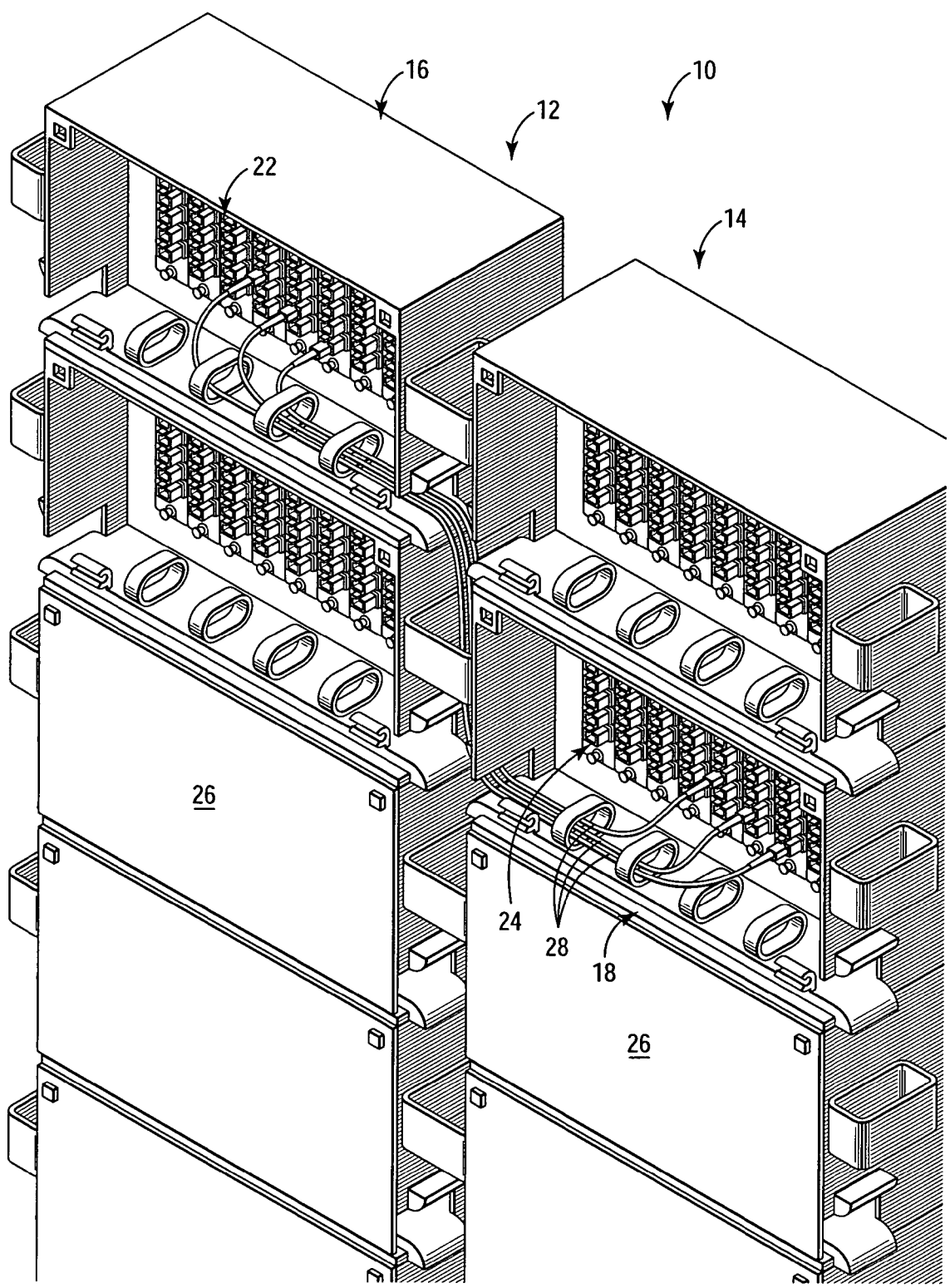
FIG. 1 is a perspective view of a conventional fiber distribution frame.

In the following description like reference numerals indicate like components to enhance the understanding of the invention through the description of the drawings. Also, although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

Referring now to FIG. 1, shown is a conventional fiber distribution frame (FDF) 10. The fiber distribution frame 10 typically includes a plurality of bays 12, 14. Each bay typically is a vertical structure that supports a plurality of distribution shelves, e.g., distribution shelves 16, 18. Within each distribution shelf is a plurality of interconnection panels or modules, e.g., interconnection panels 22, 24. The interconnection panels, which have a plurality of termination ports for connection and cross-connection to individual fibers, will be discussed in greater detail hereinbelow. Although the distribution frame 10 shown relates to optical fiber connections, distribution frames also exist that provide connections other than optical connections between cables (e.g., electrical).

A network of transmission cables having groups of individual fibers are routed to and from the distribution frame 10. The transmission cables can be routed through conduits or without conduits, depending on the application and the location of the distribution frame 10. Often, to aid in the organization of the fiber connections, one bay, e.g., bay 12, is used for connecting to fibers from cables routed from an outside environment, while the other bay, e.g., bay 14, is used for connecting to fibers from cables that run internally to customer equipment. The individual fibers typically are routed along the rear or side of the distribution frame 10, with the fibers being introduced to the interconnection panels through an aperture in the rear or side of the appropriate shelf.

The distribution frame 10 sometimes also includes a system controller (not shown), which typically is located on the top, rear or side of the distribution frame 10, and one or more shelf controllers (not shown), which typically is located behind or to the side of its associated shelf. The system controller communicates with the shelf controllers, which communicate with the termination ports in the interconnection panels. The shelf controllers have the necessary software to monitor the various connections of the interconnection panels in the respective shelf. The system controller contains the necessary software-based intelligence to monitor, maintain and coordinate existing and future permissible connections between the interconnection panel termination ports in the various shelves.

The distribution frame 10 includes one or more covers 26 for protecting the fiber distribution shelves. Typically, each cover 26 is dimensioned and configured to protect its associated shelf. Alternatively, the cover is dimensioned and configured to protect a plurality of shelves within one or more bays. The covers are configured, e.g., as hinged doors that open and close in front of the shelves or, alternatively, as detachable plates that are positioned in front of the shelves. As shown in FIG. 1, for purposes of illustration, the covers of the top two shelves in each bay have been removed, while the covers of the lower shelves in each bay remain in position in front of their respective shelf.

Figure 2:
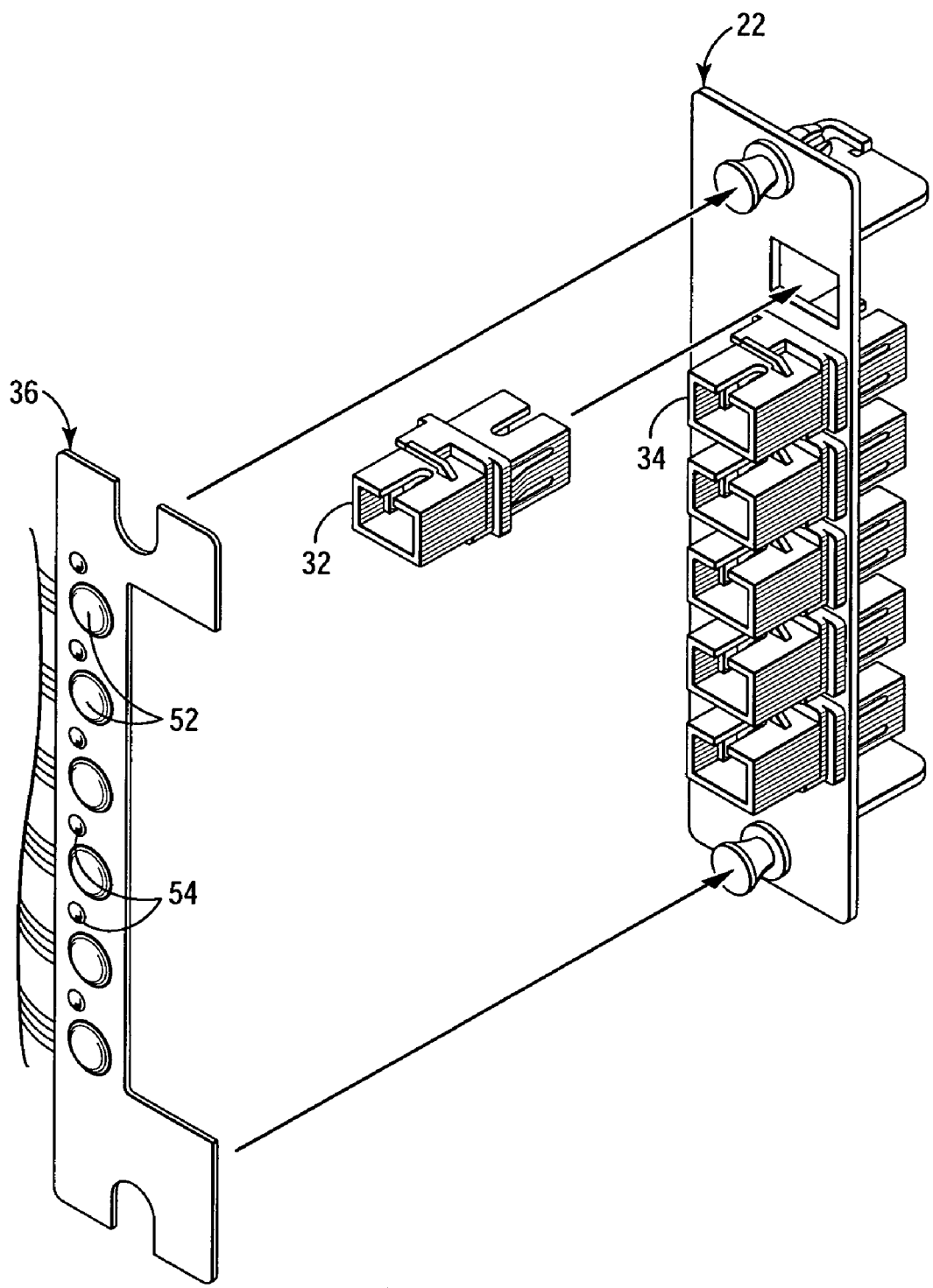
FIG. 2 is an exploded, perspective view of a conventional interconnection panel in a conventional distribution frame with a conventional overlay that positions over the conventional interconnection panel.

Referring now to FIG. 2, with continued reference to FIG. 1, shown is the face of a conventional interconnection panel, e.g., interconnection panel 22. As just discussed, the interconnection panels are located within various shelves in the distribution frame 10. For example, interconnection panel 22 is located within the distribution shelf 16. As shown in FIG. 1, the interconnection panels are recessed within their respective shelf for protection and to allow room for cross-connect jumper cables (e.g., patch cords) to cross-connect various termination ports. For purposes of illustration, in FIG. 1, a set of jumpers or patch cords 28 are shown cross-connected from termination ports in the interconnection panel 22 in the shelf 16 to termination ports in the interconnection panel 24 in the shelf 18. In this illustration, the jumpers 28 are routed through apertures in the side of the shelves. In this manner, it is possible to cross-connect fibers from any termination port in any interconnection panel from any shelf within the distribution frame 10. Often, as discussed above, if one bay, e.g., bay 12, is used for connecting to fibers from cables routed from an outside environment, and the other bay, e.g., bay 14, is used for connecting to fibers from cables that run internally to customer equipment, jumpers typically will cross-connect fibers from bay 12 to bay 14, e.g., as shown.

As shown in FIG. 2, the interconnection panel 22 includes a number of termination ports or jacks. Although the interconnection panel 22 shows six termination ports, conventional interconnection panels support any number of termination ports, e.g., six, eight or twelve ports. The termination ports are adapted to connect to a pair of fibers routed to the distribution frame 10, e.g., from a fiber cable from an outside environment or a fiber cable from internal customer equipment. For example, on module 22, a port 32 connects to a transmit fiber from an outside environment or from internal customer equipment, and a port 34 connects to a receive fiber from an outside environment or from internal customer equipment. Typically, fiber connections to these termination ports occur in the rear of the interconnection panel (not shown), i.e., behind the face of the interconnection panel. However, alternatively, fibers can be connected to the front of these termination ports.

The other termination ports are useful for other optical connections, e.g., cross-connections with termination ports of other interconnection panels. Such cross-connections are made, e.g., using an optical jumper or patch cord. In this manner, optical connections are made, e.g., between optical fibers from an outside environment to internal customer equipment.

Because of the relatively large number of interconnection panels typically contained within the shelves of a distribution frame, each interconnection panel typically also includes an individual overlay or faceplate 36 to assist in the organization of the various connections and cross-connections. See, e.g., the fiber distribution shelf face panel assembly shown in FIG. 2 of U.S. Pat. No. 6,437,894, which is assigned to the assignee of this application. Also, see, e.g., the plastic membrane overlay shown and discussed in U.S. Pat. No. 6,501,897, which is assigned to the assignee of this application.

The overlay 36 includes signal buttons and corresponding indicators such as LEDs, e.g., to identify the connection status of the panel's termination ports. In conventional arrangements, the overlays typically are located directly on the face of the panel, either on top of or immediately adjacent to the panel termination ports. Each overlay typically is individually connected to the associated shelf controller. As shown in FIG. 2, the module 22 includes the overlay 36, which has signal buttons 52 and corresponding indicators 54. The signal buttons typically are push switches or other appropriate devices connected to the shelf controller associated with the shelf containing the particular interconnection panel.

The distribution frame's system controller maintains the address and location of each interconnection panel through their respective shelf controllers, and the permissible connections between the various interconnection panels. Thus, when a particular interconnection panel's signal button is pressed or otherwise activated, the system controller, through communication the shelf controllers, activates the signals button's corresponding indicator (e.g., illuminates its corresponding LED) and, depending on the instructions from the system controller, activates the indicator of another interconnection panel to identify the desired cross-connection to be made.

In conventional arrangements, installing or otherwise attaching overlays typically requires the removal of individual panels from their respective shelf position. Moreover, operating the various signal buttons on the overlays requires direct access to the interconnection panels, which often requires removal of the distribution frame protective cover(s). However, removing individual panels and/or the protective cover(s) often can cause unnecessary shifting of fiber terminations to the point of disconnecting fiber connections. Also, removing individual panels and/or the protective cover(s) is cumbersome and inefficient. Moreover, because there exists many different shelf manufacturers, not all shelf features and arrangements are the same. Thus, overlays must be installed or otherwise attached to panels in different ways for different shelf layouts.

Figure 3:
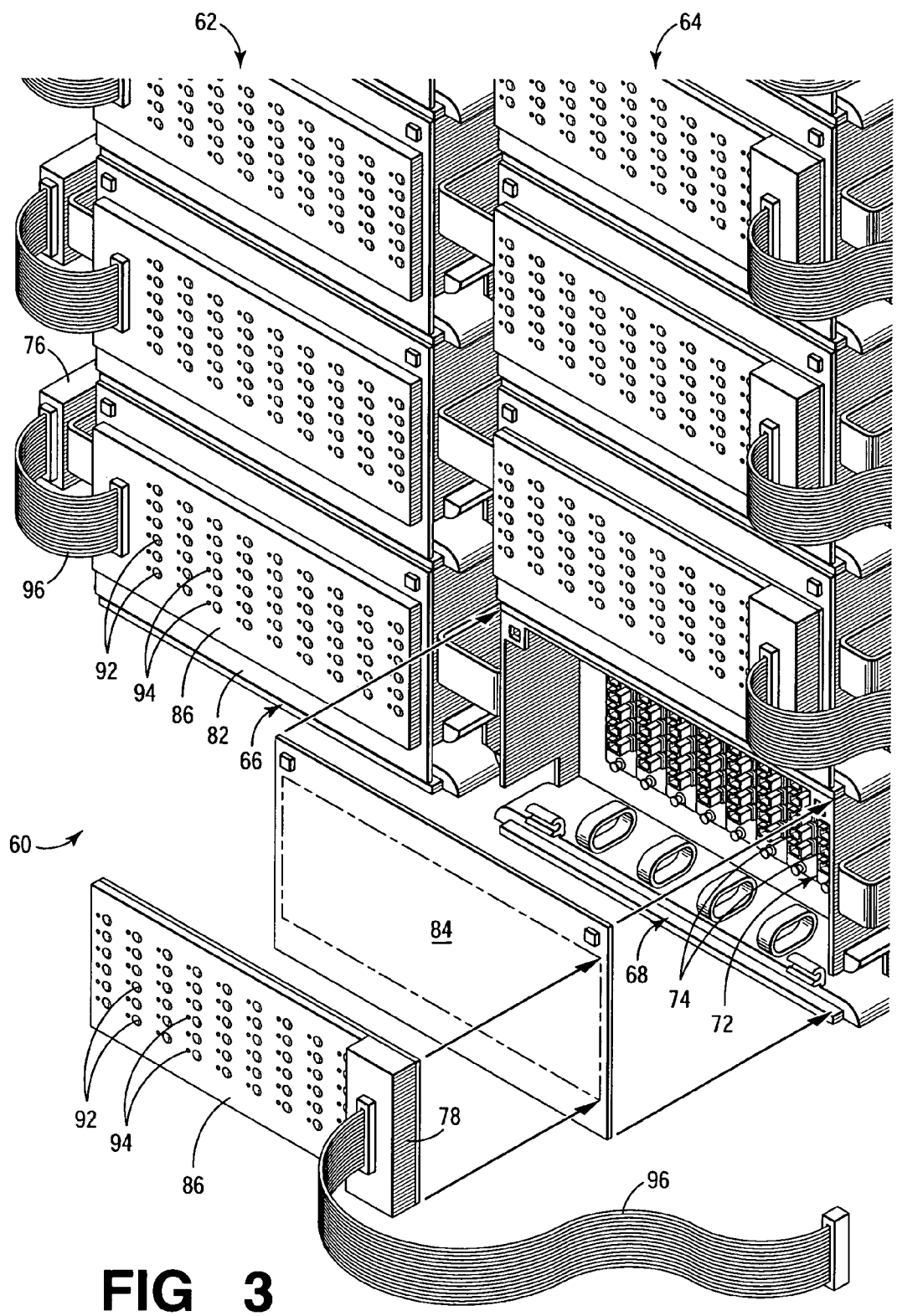
FIG. 3 is a partial, exploded, perspective view of a distribution frame according an embodiment of the invention, showing an intelligent, universal operations, administration and maintenance (OA&M) apparatus attached to the distribution shelf cover.

Referring now to FIG. 3, shown is a partial, exploded, perspective view of a distribution frame 60 according to an embodiment of the invention. Although the distribution frame 60 shown relates to optical fiber connections, distribution frames according to embodiments of the invention also provide connections other than optical connections between cables, e.g., cables routing between electronic systems to passive bulkheads or a mixture of active and passive system using cables to interconnect systems. As will be discussed in greater detail hereinbelow, it is to be understood that embodiments of the invention, in general, among other things, provide electronic intelligence that aids in locating end points or remotely terminated cables ends regardless of whether the ends are fiber ends or electrical ends.

The distribution frame includes a plurality of bays (shown generally as 62 and 64) having one or more distribution shelves, e.g., distribution shelf 66 and distribution shelf 68. Within each distribution shelf is a plurality of interconnection panels, e.g., interconnection panel 72, each having a plurality of termination ports (shown generally as 74) adapted to connect fibers from external sources routed to the distribution frame 60 and to cross-connect fiber connections across interconnection panels either within the same shelf or, more typically, across different shelves. Although this discussion relates to optical fiber connections, distribution frames such as this are suitable for providing connections other than optical connections (e.g., electrical).

As with conventional distribution frames, the distribution frame 60 according to embodiments of the invention is configured to allow for fiber cables to be routed to and from the distribution frame 60. Typically, the individual fibers from the fiber cables are routed to the termination ports 74 of the interconnection panel 72 along the rear or side of the distribution frame 60. The fibers are introduced to the interconnection panel, e.g., through an aperture (not shown) in the rear or side of the appropriate shelf.

Typically, each shelf includes a shelf controller (shown generally as 76 for the shelf 66) that conventionally is located on the face of the shelf adjacent to the interconnection panel, or on the side of or behind the shelf. According to embodiments of the invention, the shelf controller (e.g., shelf controller 78) is integral to a universal operations, administration and maintenance (OA&M) device or apparatus 86, which is discussed in greater detail hereinbelow. Alternatively, the shelf controllers for all shelves in a bay are located at a single location on the distribution frame, or the distribution frame has a single shelf controller for all shelves in a bay or the distribution frame. The shelf controllers have the necessary software to monitor the various connections of the interconnection panels in the controller's respective shelf.

The distribution frame 60 includes a system controller (not shown) that is in operable communication with the shelf controllers 76, 78. The system controller typically is located on the face of the distribution frame or, alternatively, on the top, rear or side of the distribution frame. As discussed previously herein with respect to conventional distribution frames, the distribution frame's system controller contains the necessary software to monitor, maintain and coordinate existing and future permissible connections between the interconnection panel termination ports in the various shelves.

The distribution frame 60 includes one or more covers for protecting the contents within the distribution shelves, e.g., the interconnection panels 72. For example, in FIG. 3, shelf 66 has a cover 82 and shelf 68 has a cover 84. Typically, each shelf has its own protective cover (as shown) or, alternatively, a single protective cover is dimensioned and configured to fit over a plurality of shelves, one or more bays, or even over the entire distribution frame. The protective cover is configured as a hinged door that swings open to provide access to the interior of a distribution shelf and swings closed to protect the shelf contents. Alternatively, the protective cover is a detachable plate that attaches to the front of the shelf, e.g., in a conventional manner, to provide protection and is removed to provide access to the interconnection panel within the shelf.

As discussed hereinabove with respect to conventional distribution frames, the interconnection panels in conventional distribution frames have individual face panels or overlays mounted or otherwise affixed directly on the face of the individual interconnection panels. Because the faces of the these interconnection panels are recessed within their respective shelves, accessing the interconnection panel overlays requires direct access to the face of the interconnection panels, which often requires removal or opening of the protective cover. Moreover, installing overlays on the interconnection panels often requires removing the protective cover and removing the interconnection panel, which often can cause unnecessary shifting of fiber terminations to the point of disconnecting fiber connections.

According to embodiments of the invention, the distribution frame 60 includes a universal operations, administration and maintenance (OA&M) device or apparatus 86 that is located external to the fiber distribution shelves. The OA&M apparatus 86 is configured, e.g., as a generally planar structure that attaches to any suitable portion of the distribution frame 60, e.g., to the protective cover 84 of a distribution shelf. However, according to embodiments of the invention, the OA&M apparatus 86 is attached to the distribution frame external to the interconnection panels. In this manner, the components on the OA&M apparatus 86 are accessible without removing or directly accessing the interconnection panels.

The OA&M apparatus 86 includes all the components usually contained in the plurality of conventional overlays that usually are attached to the face of the individual interconnection panels within the shelves. However, the OA&M apparatus 86 also includes other components and features that provide administrative, maintenance and other functions for the distribution frame 60. For example, the printed circuit boards used for control and operation of the interconnection panels, which conventionally are located on the back side of the shelf, are located directly on the OA&M apparatus 86. Also, for example, as discussed hereinabove, the shelf controller (e.g., shelf controller 78) is located directly on the OA&M apparatus 86.

The OA&M apparatus 86 also is suitable to include other components necessary for, e.g., jumper routing and circuit administration. Also, because of its accessibility and configuration, the OA&M apparatus 86 has space available for advanced jumper devices and their associated features. For example, the OA&M apparatus 86 is suitable for allowing a radio frequency identification (RFID) chip to be built into the jumper, thus allowing more accurate and automated jumper administration. Also, the OA&M apparatus 86 is suitable for other administrative components such as user input devices (e.g., keypads, displays such as LCD displays, and touch screens), and can accommodate other equipment that is performs functions not necessary directly related to the contents of the distribution shelves.

The OA&M apparatus 86 also includes a single interface 96, e.g., a ribbon cable and appropriate connector, that operably connects to external sources. For example, in embodiments of the invention in which the shelf controller is integral to the OA&M apparatus 86 (e.g., shelf controller 78), the interface 96 connects the shelf controller 78 to, e.g., external communications, power and ground. Alternatively, in embodiments of the invention in which the shelf controller is not located on the OA&M apparatus 86 (e.g., shelf controller 76 on distribution shelf 66), the interface connects, e.g., between the OA&M apparatus 86 and the shelf controller 76.

Regardless of the configuration, the OA&M apparatus 86 provides communication with all interconnection panels in the distribution shelf via a single interface 96 connected to the OA&M apparatus 86. In conventional arrangements, each interconnection panel communicates separately with the shelf controller via a corresponding plurality of interface connections. Thus, according to embodiments of the invention, the OA&M apparatus 86 replaces the plurality of interconnection panel overlays of a single shelf, a plurality of shelves (e.g., a bay), or even the entire distribution frame.

The OA&M apparatus 86 includes, e.g., a plurality of signal buttons 92 and corresponding indicators 94 such as LED indicators. As discussed previously herein with respect to conventional overlay arrangements, the signal buttons 92 and corresponding indicators 94 are used in conjunction with the shelf controllers 76, 78 and the system controller to identify the connection status of the panel's termination ports and to identify existing and future permissible cross-connections between interconnection panels. According to embodiments of the invention, such functionality has been moved outside of the individual shelves and is accessible from the front of the distribution frame 60, rather that inside of each individual shelf 66, 68. In this manner, embodiments of the invention provide a universal OA&M apparatus 86 that is adaptable to all distribution frame shelf configurations. Installation of the OA&M apparatus 86 is much more desirable than conventional overlay arrangements, as the individual interconnection panels do not have to be removed or otherwise accessed. All operable communication with the individual interconnection panels occurs via the interfaces 96.

According to some embodiments of the invention, the number of signal buttons 92 and corresponding indicators 94 on the OA&M apparatus 86 corresponds to the number of interconnection panels in a single shelf, or a plurality of shelves. For example, the OA&M apparatus 86 for a single shelf has a plurality of signal buttons 92 (and corresponding indicators 94) that corresponds to the number of interconnection ports within a single distribution shelf. In this embodiment, the signal buttons 92 are arranged, e.g., as an m×n array, as shown, with their corresponding indicators 94 adjacent thereto. Alternatively, the OA&M apparatus 86 represents more than one shelf (e.g., all shelves in a single bay or a pair of bays) and has a number of signal buttons 92 (and corresponding indicators 94) that corresponds to all interconnection panel overlays within the plurality of shelves represented.

In the embodiment of the invention shown in FIG. 3, the OA&M apparatus 86 attaches to, e.g., the protective cover of the shelf, e.g., in any suitable manner. For example, the OA&M apparatus 86 attaches to the shelf door by any suitable adhesive or a plurality of screws or other connection manner. Thus, installation of the universal OA&M apparatus 86 is much more suitable than for conventional arrangements, in which a plurality of individual overlay panels are attached directly to the face of corresponding interconnection panels within the interior of their respective distribution shelf.

Figure 4:
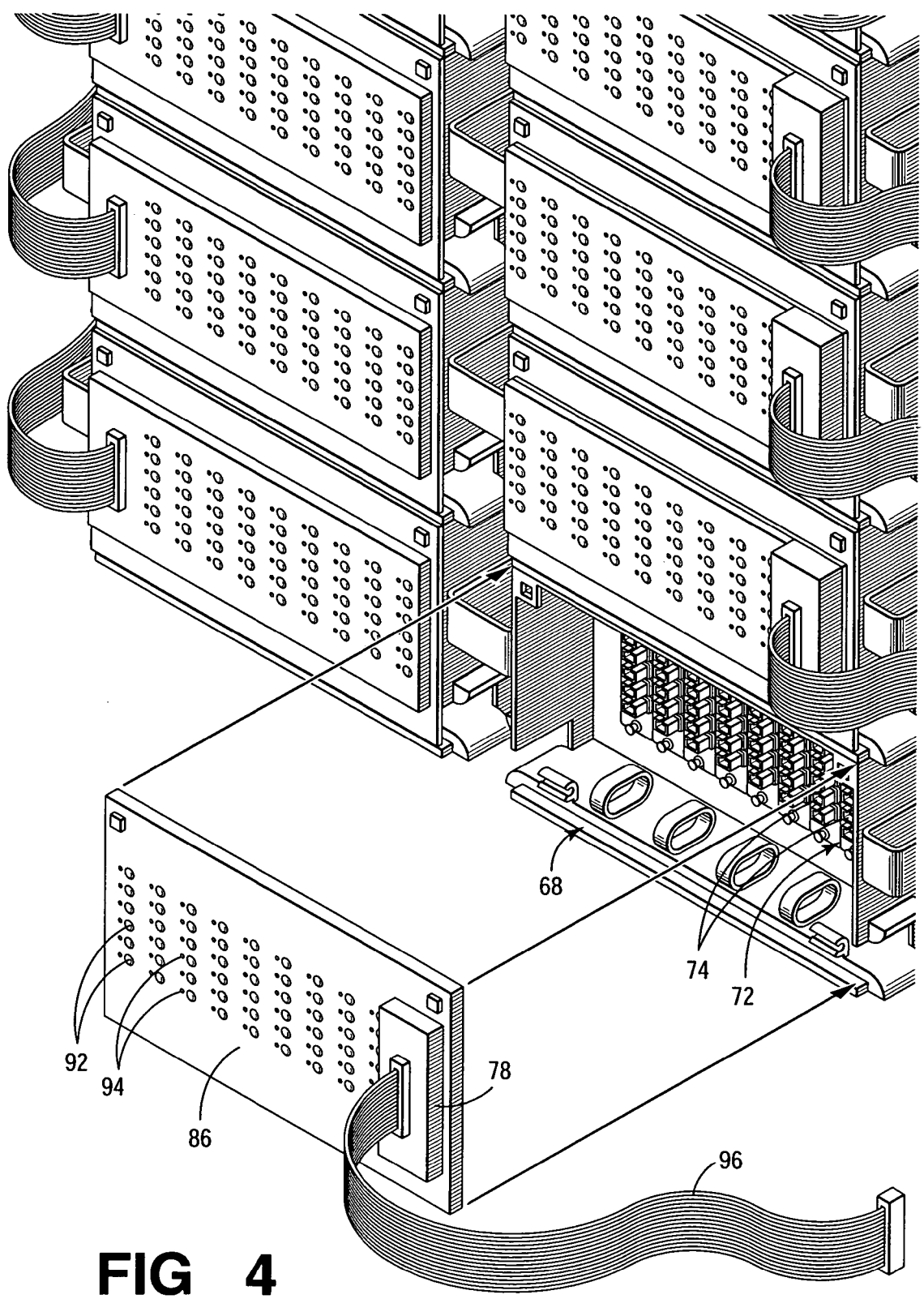
FIG. 4 is a partial, exploded, perspective view of a distribution frame according to another embodiment of the invention, showing an intelligent, universal operations, administration and maintenance (OA&M) apparatus as a cover for the distribution frame.

Referring now to FIG. 4, shown is a partial, exploded, perspective view of a distribution frame according to an alternative embodiment of the invention. In this embodiment, the OA&M apparatus 86 is configured to also serve as the protective cover of one or more distribution shelves, rather than being attached to the protective cover that, in turn, is attached to the distribution shelf. As shown, the OA&M apparatus 86 is a generally planar apparatus that is hinged or otherwise suitable for attachment to the front of the shelf (or bay, depending on the distribution frame configuration). The number of components on the OA&M apparatus 86, e.g., corresponds to the number of interconnection panels that the OA&M apparatus 86 represents. That is, if the OA&M apparatus 86 is to represent a single distribution shelf, the number of signal buttons 92 (and corresponding indicators 94) corresponds to the number of interconnection panels in that single distribution shelf. Alternatively, if the OA&M apparatus 86 is dimensioned and configured to serve a plurality of shelves, the number of signal buttons will correspond to the number of interconnection panels in that plurality of shelves.

As in the previous embodiment of the invention, the OA&M apparatus 86 in this embodiment includes all components necessary for proper operation, including, e.g., an integral shelf controller 78 and a suitable interface 96 that communicates with external devices.

It will be apparent to those skilled in the art that many changes and substitutions can be made to the embodiments of the invention herein described without departing from the spirit and scope of the invention as defined by the appended claims and their full scope of equivalents. For example, the invention could be applied to electrical communication distribution systems or wireless systems.

The invention claimed is:

1. A communications system, comprising:
   a distribution frame, the distribution frame including
      a system controller,
      at least one shelf,
      a shelf controller corresponding to the at least one shelf, wherein the shelf controller is operably coupled to the system controller, and
      at least one interconnection panel within the at least one shelf, the interconnection panel including a plurality of termination ports for cross-connecting signal channels; and
   an intelligent fiber distribution operations administration and maintenance apparatus coupled to the distribution frame external to the at least one shelf and operably coupled between the interconnection panels and the shelf controller for operating the distribution frame and monitoring and indicating cross-connections between the interconnection panels.

2. The communications system as recited in claim 1, wherein the distribution frame has a shelf cover, and wherein the intelligent fiber distribution operations administration and maintenance apparatus is attached to the shelf cover.

3. The communications system as recited in claim 1, wherein the intelligent fiber distribution operations administration and maintenance apparatus is configured as a shelf cover for the distribution frame.

4. The communications system as recited in claim 1, wherein the distribution frame includes at least one controller that monitors permissible connections and cross-connections of the at least one interconnection panel, and wherein the intelligent fiber distribution operations administration and maintenance apparatus includes an interface operably connected to the at least one controller.

5. The communications system as recited in claim 1, wherein the intelligent fiber distribution operations administration and maintenance apparatus includes an input interface for the interconnection panel termination ports.

6. The communications system as recited in claim 1, wherein the intelligent fiber distribution operations administration and maintenance apparatus includes signal buttons and indicators corresponding to the interconnection panel termination ports.

7. The communications system as recited in claim 6, wherein the indicator further comprises an LED indicator.

8. The communications system as recited in claim 1, wherein the intelligent fiber distribution operations administration and maintenance apparatus is configured to be operably connected to at least one input device selected from the group consisting of a keypad, a keyed display, a keyless display, an LCD display screen, and a touch screen.

9. The communications system as recited in claim 1, wherein the communication system further comprises a plurality of interconnection panels and wherein the intelligent fiber distribution operations administration and maintenance apparatus further comprises an array of user inputs that correspond to the interconnection panel termination ports.

10. An intelligent fiber distribution operations administration and maintenance apparatus for operably coupling to a distribution frame, wherein the distribution frame has a system controller, at least one distribution shelf, the distribution shelf having a shelf controller and a plurality of interconnection panels, wherein the shelf controller is coupled to the system controller, and wherein the interconnection panels include a first plurality of termination ports for connecting to a first signal channel and a second plurality of termination ports for cross-connecting to a second signal channel from a different interconnection panel, the intelligent fiber distribution operations administration and maintenance apparatus comprising:

a plurality of signal buttons corresponding to the plurality of interconnection panels, wherein the signal buttons are attached to the distribution frame and operably connected to the interconnection panels;

a plurality of indicators corresponding to the plurality of signal buttons; and an interface operably connecting the plurality of signal buttons to the shelf controller, wherein the signal buttons energize their corresponding indicator and, based on information from the shelf controller, the indicators identify termination ports that are connected, to be connected or that need maintenance, and wherein the intelligent fiber distribution operations administration and maintenance apparatus is configured to be operably coupled to the distribution frame external to the at least one distribution shelf.

11. The apparatus as recited in claim 10, wherein the distribution frame includes a cover for protecting the distribution shelf, and wherein the intelligent fiber distribution operations administration and maintenance apparatus is adapted to attach to the distribution frame cover.

12. The apparatus as recited in claim 10, wherein the intelligent fiber distribution operations administration and maintenance apparatus is configured as a protective cover coupled to the distribution frame for protecting the distribution shelf.

13. The apparatus as recited in claim 10, further comprising a user input apparatus operably connected to the interface.

14. The apparatus as recited in claim 10, wherein the intelligent fiber distribution operations administration and maintenance apparatus is arranged as an array of user inputs that correspond to the interconnection panel termination ports.

15. The apparatus as recited in claim 10, wherein the distribution frame includes a cover for protecting the distribution shelf, wherein the intelligent fiber distribution operations administration and maintenance apparatus further comprises a planar structure connected to the cover, and wherein the plurality of signal buttons and the plurality of indicators are coupled to the planar structure.

16. The apparatus as recited in claim 15, wherein the planar structure has a first surface for coupling to the cover and an opposing second surface, and wherein the plurality of signal buttons and the plurality of indicators are coupled to the second surface of the planar structure.

17. The apparatus as recited in claim 10, wherein the plurality of indicators further comprise LED indicators.

* * * * *